United States Patent [19]

Mani et al.

[11] Patent Number: 4,976,838

[45] Date of Patent: Dec. 11, 1990

[54] METHOD FOR PURIFICATION OF BASES FROM MATERIALS COMPRISING BASE AND SALT

[75] Inventors: Krishnamurthy N. Mani, Basking Ridge; Frederick P. Chlanda, Rockaway; Yu-Chih Chiao, Bridgewater, all of N.J.

[73] Assignee: Allied-Signal Inc., Morristown, N.J.

[21] Appl. No.: 278,626

[22] Filed: Dec. 1, 1988

[51] Int. Cl.$^5$ ............... C01B 33/32; B01D 13/02
[52] U.S. Cl. ............... 204/182.3; 204/182.4; 204/182.5; 204/301; 204/98
[58] Field of Search ............... 204/182.3, 182.4, 98, 204/301, 182.5

[56] References Cited

U.S. PATENT DOCUMENTS

| | | | |
|---|---|---|---|
| 2,829,095 | 4/1958 | Oda et al. | 204/98 |
| 3,111,472 | 11/1963 | Oda et al. | 204/180 |
| 3,787,304 | 1/1974 | Chlanda et al. | 204/180 P |
| 4,024,043 | 5/1977 | Dege et al. | 204/296 |
| 4,107,015 | 8/1978 | Chlanda et al. | 204/182.4 |
| 4,116,889 | 9/1978 | Chlanda et al. | 521/27 |
| 4,391,680 | 7/1983 | Mani et al. | 204/98 |
| 4,474,771 | 10/1984 | Morita | 424/195 |
| 4,536,269 | 8/1985 | Chlanda et al. | 204/182.4 |
| 4,557,815 | 12/1985 | Scott et al. | 204/182.2 |
| 4,608,141 | 8/1986 | Chlanda et al. | 204/182.5 |
| 4,629,545 | 12/1986 | Mani et al. | 204/182.4 |
| 4,738,764 | 4/1988 | Chlanda et al. | 204/296 |
| 4,740,281 | 4/1988 | Chlanda et al. | 204/151 |
| 4,766,161 | 8/1988 | Chlarda et al. | 521/27 |

FOREIGN PATENT DOCUMENTS 0141517 5/1985 European Pat. Off. ......... 204/182.3

OTHER PUBLICATIONS

Chemical Abstracts )1959) 53:11070(b) citing Japanese 2023 (1958).
*Principles of Deslination*, Chapter 6, "Electrodialysis", pp. 199-289, Shaffer et al., Academic Press (1966), (K. S. Spiegler, Editor).

Primary Examiner—John F. Niebling
Assistant Examiner—Arun S. Phasge
Attorney, Agent, or Firm—Gerard P. Rooney

[57] ABSTRACT

The present invention is a method of recovery of base from material comprising base or acid and salts. The method is conducted in an apparatus comprising a cation membrane between two bipolar membranes.

23 Claims, 3 Drawing Sheets

4,976,838

METHOD FOR PURIFICATION OF BASES FROM MATERIALS COMPRISING BASE AND SALT

BACKGROUND OF THE INVENTION

This invention relates to a process for recovering base from salt solutions containing excess acid or base. More particularly, the invention is directed to the recovery of bases such as sodium hydroxide from spent process material, such as spent liquor from a process to produce nickel cadmium batteries. The spent liquor comprises free base and soluble salt in an aqueous solution.

U.S. Pat. No. 4,608,141 discloses a multi chamber two compartment electrodialytic water splitter and a method for using the same for the basification of aqueous soluble salts. U.S. Pat. No. 4,536,269 discloses a multi chamber two compartment electrodialytic water splitter and a method for using the same for the acidification of aqueous soluble salts. These two patents review the use of two compartment electrodialytic water splitters to treat salts.

Reference is made to Principles of Desalination, Shaffer, et al., Chapter 6, Electrodialysis pp. 199–289, Academic Press, 1966, for a review of electrodialysis. Electrodialytic water-splitting in two compartment cells is well known. For example, U.S. Pat. No. 4,391,680 discloses the generation of strongly acidified sodium chloride and aqueous sodium hydroxide by two compartment water-splitting of aqueous sodium chloride. Three compartment electrodialytic water splitters are known in the art. These are disclosed to be comprised of alternating bipolar, anion and cation permselective membranes thereby forming alternating acid, salt and base compartments. U.S. Pat. No. 4,474,771 discloses three compartment electrodialytic water splitters. U.S. Pat. No. 4,740,281 discloses the recovery of acids from materials comprising acid and salt using an electrodialysis apparatus to separate a portion of the acid followed by the use of an electrodialytic three compartment water splitter to regenerate the acid from the salt.

The staging of two conventional two compartment electrodialytic water splitters whereby the base solution is withdrawn from the base compartment of one two compartment water splitter and is fed through the base compartment of the second two compartment water splitter is known. In an attempt to increase the efficiency of bipolar membranes, U.S. Pat. No. 3,111,472 (Oda, et al.) discloses disposing a microporous water permeable cation or neutral membrane in the acid and/or base compartments of the three compartment electrodialytic water splitter.

Although bipolar membranes have been known to be useful for the process of electrodialytic water splitting to generate an acid and a base for many years (Oda et al. U.S. Pat. No. 2,829,095, Chlanda et al. U.S. Pat. No. 3,787,304, Jenczewski et al. U.S. Pat. No. 4,552,635) and their use in various cell configurations has been reported (Oda et al. Japan. 2,023 ('58) reported in Chemical Abstracts 53:11070b. U.S. Pat. No. 4 536 269 and U.S. Pat. No. 4 608 141) their use as highly selective membranes which effectively transport only H+ or OH− ions therefore making them effective for the purification of acids or bases without the generation of the opposite product has not been realized.

None of the above references disclose separating a base from salt containing solution using a bipolar membrane, in an apparatus such as a two compartment water splitter, followed by removing the salt solution.

The art, teaches that anion membranes preferentially permit the selective transport of hydroxal ions over other anions such as $Cl^-$, $SO_4^=$, nitrate, or fluoride, but the selectivity is small.

SUMMARY OF THE INVENTION

The present invention is a method of separating base from an aqueous feed stream comprising base and a salt. The salt comprises cations and anions. The method of the present invention is conducted using a base purification apparatus comprising at least two bipolar membranes each of which comprise a cation layer and an anion layer. The cation layer permits the cations to pass through, and the anion layer permits anions to pass through. The cation layer is a barrier to anions and the anion layer is a barrier to cations. There is a cation membrane located between the at least two bipolar membranes, the at least one first bipolar membrane and at least one second bipolar membrane. The base purification unit has two compartments. A feed compartment F is defined as the space between the cation layer of the first bipolar membrane and the cation membrane. A product compartment P is defined as the space between the anion layer of the second bipolar membrane and the cation membrane. While the apparatus used has the same structure as a two compartment water splitter, the function is completely different since it serves as a base purification unit rather than a generator of acid and base.

The process comprises the steps of feeding an aqueous feed stream comprising base and salt to the at least one feed compartment. An aqueous product feed stream is fed to the at least one product compartment.

A sufficient electrical potential is applied to cause a direct electrical current to pass across the apparatus, resulting in the introduction of hydrogen ions (H+) formed at the first bipolar membrane into the product compartment and hydroxyl ions (OH−) formed at the second bipolar membrane into the product compartment. The current causes the cations to transfer across the at least one cation membrane. The cations transfer into the at least one product compartment. The concentration of base in the feed compartment is reduced as a result of the transfer of cations and the introduction of OH− increases the base concentration in the product compartment. The process further comprises the step of removing the resulting product stream from the product compartment and removing the resulting feed stream from the feed compartment.

Preferably the apparatus comprises at least one feed compartment with each feed compartment alternating with a product compartment. In a preferred embodiment the apparatus comprises a plurality of alternating bipolar and cation membranes resulting in a plurality of product and feed compartments. Such an arrangement makes the production unit compact and is thereby less capital and space intensive.

An additional embodiment of the present invention is a method which comprises the steps of feeding a solution comprising a salt and a base to a two compartment base purification apparatus. In the two compartment base purification unit the solution of the salt and the base results in a first salt stream. Substantially, all of the base is separated from this first salt stream. Preferably, the two compartment base purification unit produces this first salt stream so that the pH of the salt stream is about 7. The base leaves the two compartment base purification unit as a first base stream. The base which was present in the original salt solution is removed from the process. The substantially neutral first salt stream is fed to a three compartment water splitter. The salt is split to form a second base stream, an acid stream comprising an acid and optionally salt and finally the dilute residue of the salt compartment which results in the dilute salt stream. In a specific and preferred embodiment the dilute salt stream is reconcentrated for recycle. The dilute salt stream can be concentrated by suitable means including electrodialysis or reverse osmosis.

The combination of a two compartment base purification unit and three compartment water splitting for the production of base from solutions of salt which contain significant amounts of base is advantageous compared to the use of only a 3 compartment unit because of the reduced membrane area and power requirements of the two compartment unit compared to a three compartment unit. Some additional operating freedom can also be gained. For example, a neutral salt stream can be fed to the salt compartment of a three compartment water splitter permitting the use of a weak base type anion membrane. Such membranes have high efficiencies. Without prior treatment in the 2-compartment base purification unit, the stream would be highly alkaline and cause the weak base membrane to exist in an unprotonated form not suitable for ion transport.

The introduction of a highly basic solution into the acid compartment of the base purification unit is not disclosed in published literature. Most prior reference including those referred to in the background have generally dealt with introduction of neutral or near neutral solution in the salt loop and water to the acid/base loop of two compartment water splitters. General concerns with the procedure (i.e. introducing highly alkaline feed to the acid compartment) would have been inefficiency, danger of precipitate formation and membrane swelling/shrinkage problems. All of these concerns have been found not to be the case.

DETAILED DESCRIPTION OF THE INVENTION

The present invention will be understood by those skilled in the art by reference to the accompanying figures.

The present invention is a method of separating base from an aqueous feed stream comprising base and salt comprising metal cations and anions. The method is conducted in an apparatus comprising at least two bipolar membranes with each bipolar membrane comprising a cation layer and an anion layer. A cation membrane is located between at least one first bipolar membrane and at least one second bipolar membrane. There is a feed compartment (F) between the cation layer of the first bipolar membrane and the cation membrane. There is a product compartment (P) between the anion layer of the second bipolar membrane and the cation membrane.

The method comprises the steps of feeding an aqueous feed stream comprising base and salt to the at least one feed compartment and feeding an aqueous product stream to the at least one product compartment. A sufficient electrical potential is applied to cause a direct electrical current to pass across the feed compartment and the product compartment causing $H^+$ formed at the first bipolar membrane to be introduced into the feed compartment. It is believed that water migrating into the anion or cation layer of the bipolar membrane is split so that hydroxyl migrates through the anion layer and hydrogen ion migrates through the cation layer. The hydrogen ion is transferred through the cation layer into the feed compartment. The cations from the feed stream transfer across the cation membrane into the product compartment. The concentration of base in the feed compartment is reduced as a result of cations being transferred into the product compartment which combine with the hydroxyl ions formed at the second bipolar membrane to result in a base. The resulting product stream containing the base is removed from the product compartment and the resulting feed stream less the base cations and hydroxyl ions and containing the salts is removed from the feed compartment. Specific and preferred embodiments are reviewed below in connection with the accompanying figures.

Figure 1:
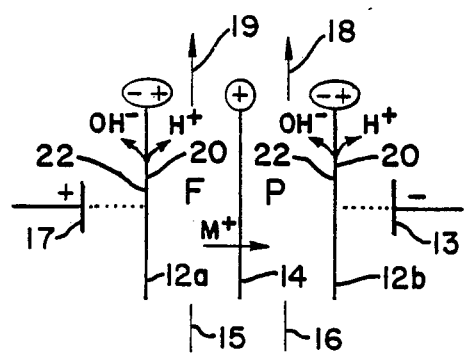
FIG. 1 schematically illustrates the ion transport in the two compartment base purification unit useful in the process of the present invention where there is a solution comprising salt and a base.
Figure 2:
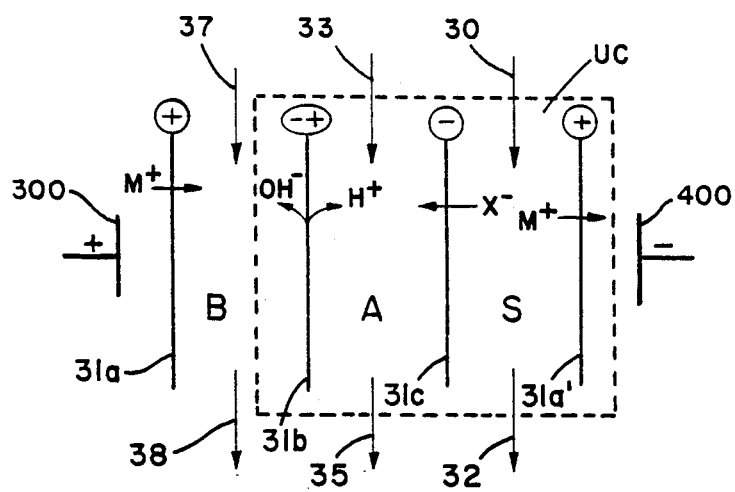
FIG. 2 schematically illustrates a three compartment electrodialytic water splitter useful for carrying out the water-splitting step of splitting the salt stream of the present invention.

FIG. 1 is a schematic drawing of a base purification unit. FIG. 2 is a schematic drawing of a three compartment electrodialytic water splitter.

Both two and three compartment water splitters for the production of acid and base from salt are known. In some circumstances, however, a stream contains not only salt but contains significant amounts of acid or base. For example, a stream may contain NaOH and $NaNO_3$. If such a stream is introduced into the salt compartments of a three compartment water splitter, then the efficiency of that splitter for acid production will be lower because of the transport of hyroxide to the acid compartments. One alternative is to generate $HNO_3$ from the sodium nitrate and use part of this nitric acid to neutralize the NaOH in the influent stream. The disadvantage of this is that since a solution of $HNO_3$ is used, the influent stream volume increases and the solution may be more dilute and that in the net, a single product (NaOH) is produced in the three compartment water splitter. An attractive alternative is to use a two compartment base purification unit of the present invention as a direct means of neutralizing the NaOH of the influent stream. This will result in the production of the NaOH in the base purification unit which because of the elimination of the anion membrane and acid compartment has lower power requirements and mechanical complexity compared to a three compartment splitter. The neutralized salt from this system can then be used as the feed to a conventional three compartment system.

FIG. 1 illustrates a two compartment base purification unit useful in the present invention. The unit contains alternating bipolar and cation membranes disposed between two electrodes thereby forming alternating feed compartments (F), and product compartments (P). The two compartment base purification unit contains a plurality of cation membranes 14 and bipolar membranes 12. To illustrate the cell of FIG. 1 there is a first bipolar membrane 12A and a second bipolar membrane 12B. Between the bipolar membranes 12A and 12B is cation membrane 14. Each bipolar membrane has cation layer 20 and anion layer 22. Each cation layer 20 faces cathode 13 and each anion layer 22 faces anode 17. A feed compartment F is defined by the space between the cation membrane 14 and the cation layer of the first bipolar membrane 12A. A product compartment is defined by the space between the cation membrane 14 and the anion layer of the second bipolar membrane 12B.

A solution stream 15 comprising a salt and a base is fed to feed compartment F. A stream comprising water is introduced as aqueous stream 16 into product compartment P via aqueous stream 16.

The cation membrane selectively allows the transfer of cations. Hydrogen ions produced by bipolar membrane 12A are introduced into a solution of salt and base neutralizing the excess $^{-OH}\cdot M^+$ passes across the cation membrane and forms a base in P. In this way the base is separated and removed from feed F and removed in the product compartment P via stream 18. The neutralized salt is removed from F via line 19. $M^+$ represents the cation in the salt which is typically a metal or non metal such as ammonium.

In accordance with the method of the present invention the apparatus can further comprise a plurality of alternating bipolar membranes and cation membranes resulting in at least one feed compartment wherein each feed compartment is alternating with one product compartment.

Since the bipolar membrane is capable of eliminating the transport of almost all anions other than $OH^-$, the base produced contains far less salt (i.e. anionic impurity) than the feed stream.

The cations include mono, di and trivalent metallic and non metallic cation including ammonium. The anions include monovalent anions such as halides, divalent anions such as sulfates, trivalent anions such as phosphates and mixtures thereof. Typical base and salt combinations which can be purified include NaOH/NaCl, NaOH/NaOAc, NH$_4$OH/NH$_4$Cl, NaOH/NaNO$_3$, NH$_4$OH/NH$_4$NO$_3$, and Na$_3$PO$_4$/NaOH. Mixtures of bases may also be purified with respect to anionic impurities e.g. NaOH/KOH/NaNo$_3$ can be processed to give purified NaOH/KOH.

Base feed streams can have base concentration in a range of from 0.1N up to concentrations of 5N or more. The concentration of the product will usually be higher than the concentration of the feed, but may be equal or lower especially when the feed concentration is high. The efficiency of a system of the type shown in FIG. 1 depends on the selectivity of the cation membrane. Better cation membranes allow the generation of higher base concentrations. Preferably the concentration of base in the feed is 0.1N to 5N and most preferably 1N to 3N. The salt can be at concentrations up to saturation, preferably from 0.001 molar to saturation concentration, and are typically 0.1 molar or more.

The resulting product stream 18 will have no more than 0.1 times and preferably no more than 0.01 times the salt concentration as the original feed stream 15.

Useful operating temperatures of from 0° C. and 100° C. are possible if the stability of the membranes and the solubility of the solution constituents permit. Generally, membrane life is longer at lower temperatures and power consumption will be lower at higher temperatures. Preferred operating temperatures are between 25° and 60° C. and more preferably from 35° and 50° C.

After the base is separated from the basic salt solution, the substantially neutralized salt solution can be fed to a three compartment water splitter to further reduce the salt concentration and produce acid and base by splitting the salt. A three compartment electrodialytic water splitter comprises at least one unit cell comprising cation membrane, water-splitting membranes, and anion membranes arranged in alternating fashion to define base, acid, and salt compartments.

Employed in both units are means for splitting water into hydrogen ions and hydroxyl ions (water-splitting membrane). Most preferably, the means for splitting water into hydrogen and hydroxyl ions is a bipolar membrane. Examples of bipolar membranes which are particularly useful include those described in U.S. Pat. No. 2,829,095 to Oda, et al. (which has reference to water splitting generally), in U.S. Pat. No. 4,024,043 (which describes a single film bipolar membrane), and in U.S. Pat. No. 4,116,889 (which describes a cast bipolar membrane and is most preferred). A useful three compartment water splitter is disclosed in U.S. Pat. No. 4,740,281 hereby incorporated by reference and is shown in FIG. 2. However, any means capable of splitting water into hydrogen and hydroxyl ions may be used; for example, spaced apart anion and cation membranes having water disposed therebetween.

The cation membranes employed in both the base purification unit and the three compartment electrodialytic water splitter may be moderately acidic (e.g., phosphonic group-containing) or strongly acidic (e.g., sulfonic group-containing) cation permselective membranes having a low resistance at the pH at which they are employed. Particularly useful cation membranes are Dupont's Nafion 110 and 324 cation membranes. More preferably, the cation membranes are of the composition and construction as disclosed in U.S. Pat. No. 4,738,764 to Chlanda, et al.

The anion membranes used in the three compartment electrodialytic water splitter are strongly, mildly, or weakly basic anion permselective membranes. Usable membranes are, for example, commercially available from Ionics, Inc., Watertown, Mass. (sold as Ionics 204-UZL-386 anion membrane), or from Asahi Glass Co. (sold under the trade name Selemion AMV, ASV, or AAV anion permselective membranes).

FIG. 2 schematically illustrates a typical design of a three compartment electrodialytic water splitter employed to recover and regenerate acid and base from salt solutions. As illustrated, the three compartment electrodialytic water splitter comprises, in series, an anode 300 (e.g., a platinum anode), an anolyte compartment, alternating base B, acid A, and salt S compartments, a catholyte compartment, and a cathode 400 (e.g., a platinum cathode). The base, acid and salt compartments of the three compartment water splitter illustrated in FIG. 2 are defined by a plurality of serially arranged membranes as follows: a cation permselective membrane 31a, a bipolar membrane 31b, anion permselective membrane 31c, and a cation permselective membrane 31a'. Although FIG. 2 shows four serially arranged membranes, the three compartment electrodialytic water splitters are defined by a plurality of unit cells, each unit cell comprising an anion membrane, a cation membrane and a bipolar membrane (or equivalent structures capable of splitting water into hydrogen and hydroxyl ions).

In accordance with the invention, the solutions introduced into the anolyte and catholyte compartments can contain a salt, base or acid solution (e.g., KOH or dilute salt). The solutions introduced into the acid A and base B compartments comprise water added via 33 and 37, respectively. Solution comprising salt is introduced in salt compartment S via line 30. Splitting of the salt into acid and base commences by applying a direct current through the water splitter from the anode to the cathode.

In the acid compartment A which is supplied with a liquid comprising water, hydrogen ions ($H^+$) are added via the function of the bipolar membrane 31b. Simultaneously, anions (designated $X^-$ in the drawings) of the salt(s)) are transported across the anion membrane 31c into the acid compartment. The reaction of the hydrogen ions with the anions yields an acid product HX. The designation $X^-$ (and from the MX or HX) refers not only to monovalent anions but also to divalent anions, such as sulfates, and trivalent anions, such as phosphates, and mixtures thereof.

Cations in the salt compartment simultaneously pass through the cation membrane 31a to the catholyte and from the anolyte to the base B compartment. In the base B compartment, cations ($M^+$) migration through the cation membrane 31a react with the hydroxyl ions ($OH^-$) generated by the bipolar membrane 31b to produce a basified solution.

The electrodialytic water splitter can be operated in a batch mode, a continuous mode, or variations thereof. Product solutions or portions thereof (e.g., when using a feed and bleed apportionment operation) may be recycled for further concentration. Moreover, it should be evident that mechanisms for serial feed through similar compartments (not shown) may be employed. These and other modifications, changes and alterations to the design of the water splitter will not affect the scope of the invention and will be obvious to those of ordinary skill.

The current passed through the water splitter in conventional fashion is direct current of a voltage dictated by design and performance characteristics readily apparent to the skilled artisan and/or determined by routine experimentation. Current densities between 25 and 300 amps per square foot (between 28 and 330 milliamps per square centimeter) are preferred; and current densities between 50 and 150 amps per square foot (between 55 and 165 milliamps per square centimeter) are more preferred. Higher or lower current densities can be used for certain specific applications.

In the case of feeds which contain species which become insoluble at lower pH, periodically interrupting or greatly reducing the electric current, preferably for 0.5 to 5 minutes and more preferably for 1 to 3 minutes can be helpful in reducing the effects of fouling of the cation layer of the bipolar membrane. The intervals between and duration of such interruptions will depend on the relative amounts of acid and metals and the fluid flow in the cell. Effective periods and intervals can be determined by experimentation. An increase in the pressure needed to maintain flow through the feed compartments would be one indication that a current interruption should be made and that the current should not be increased to normal until the high pressure returned to a normal level.

In electrodialysis and related processes, generally the flow rate through the stack is higher than the input rate of fresh feed. The stack is operated in a recycle mode with the recycle feed being obtained from a recycle reservoir. In this way, one can determine and adjust the net input rate to obtain the desired composition changes for the entire system even though the stack may be small. Feed to each recycle loop of the system and product removal may be made continuously (steady state operation) or periodically (batch operation).

With regard to the base purification, the base would not necessarily need to be recovered as base, but could be converted to another product. For example a stream consisting of NaOH and NaCl could be used as the feed and the base product stream treated with $Al(OH)_3$ to produce a base product of sodium aluminate. The base such as NaOH can be reacted with $SiO_2$ to produce $Na_2SiO_3$.

Figure 3:
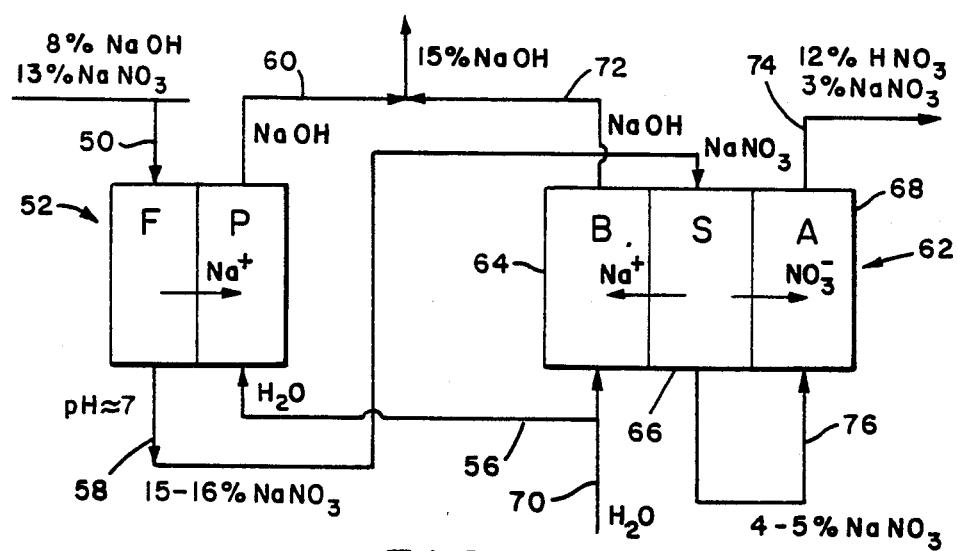
FIG. 3 schematically illustrates a preferred embodiment of the present invention comprising a two compartment base purification unit and a three compartment electrodialytic water splitter.
Figure 4:
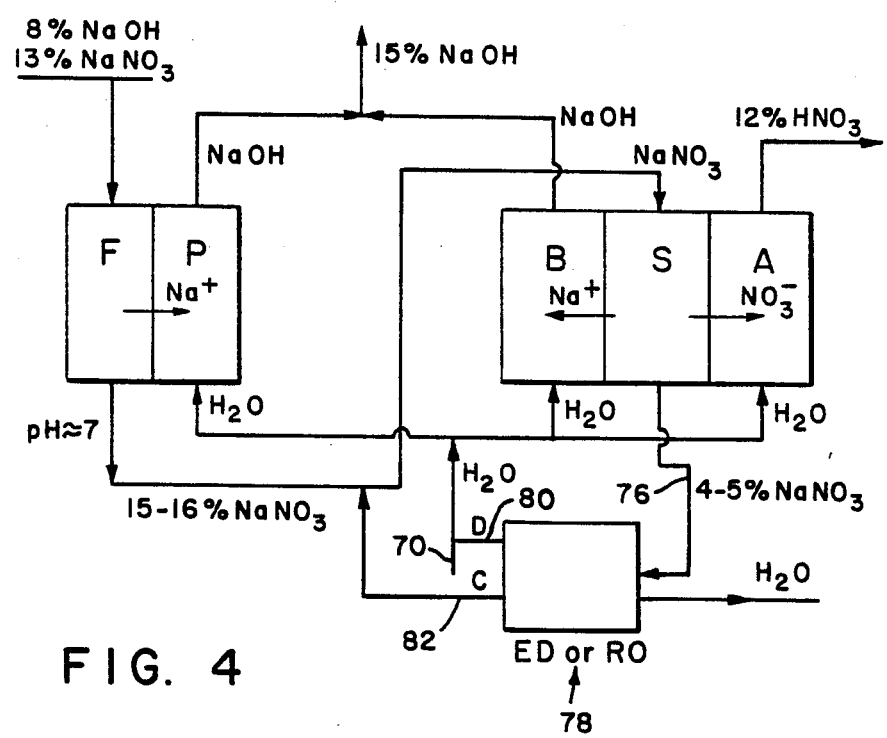
FIG. 4 schematically illustrates a preferred embodiment of the process of the present invention similar to that shown in FIG. 3 further comprising the use of a means to concentrate dilute salt stream from the three compartment water electrodialytic water splitter.

Preferred embodiments of the present invention are shown in FIGS. 3 and 4.

The embodiment of FIG. 3 illustrates the separation of a base from a salt base solution followed by the splitting of the salt to form acid and additional base. A solution of base and salt are fed via base/salt line 50 to a two compartment base purification unit 52 of the type shown in FIG. 2. The base and salt solution is fed into the feed compartment F formed by the cation side of the bipolar membrane and the cation membrane. An aqueous solution is fed to the product compartment P via aqueous line 56. In the manner of operation as recited above the two compartment base purification 52 is operated so that an aqueous solution of salt leaves the salt compartment via salt exit line 58. The base leaves the the two compartment base purification unit 52 through base exit line 60.

The three compartment water splitter 62 has a base compartments 64 a salt compartment 66 and a acid compartments 68. The salt exit stream 58 passes from the feed compartment 54 of the two compartment base purification unit and is fed into the salt compartment 66 of the three compartment water splitter 62. Water is fed to the base compartment 64 from water feed line 70. Optionally water can be fed to acid compartment 68.

In the embodiment shown in FIG. 3 the aqueous salt solution is fed to salt compartment 66. The salt is split into acid and base. The base leaves the base compartment of three compartment water splitter 62 via base exit stream 72. Water is fed to the acid compartment 68, and acid leaves acid compartment 68 three compartment water splitter acid exit stream 74. The salt compartment 66 has a salt exit stream 76. The stream exiting the salt compartment 66 of the three compartment water splitter 62 is a dilute solution as a result of the cation and anion being converted to acid and base. In the preferred embodiment illustrated in FIG. 3 the dilute salt solution is fed to the acid compartment 68. The acid exit stream 74 than comprises an acidified salt solution.

FIG. 4 is an embodiment which is similar to FIG. 3 except that the salt exit stream from the three compartment water splitter is fed to a means to concentrate shown as reference character 78 such as an electrodialytic concentration cell or optionally a reverse osmosis apparatus. The common elements of FIGS. 3 and 4 are analogous in structure and operation. Electrodialysis cells are available from Ionics, and Asahi Glass.

The above illustrations show useful processes for treating solutions of salt and base. The base is separated from the salt and the salt is split to attain additional base and acid. Remaining salt can be recycled through the process.

By combining a two compartment base purification unit with a three compartment water splitter an alkaline salt solution can be treated to separate the base from the salt and split the salt to form base and additional acid. The use of two compartment base purification unit such as shown in FIG. 2 provides advantages over the use of conventional electrodialysis method of recovering the free base which are not efficient because of the competing transport of $NO_3^-$ with the $OH^-$ ion. A unique feature of the two compartment base purification unit is that the bipolar membrane, in effect, behaves as a highly selective anion membrane thereby resulting in the production of a relatively pure base i.e. high recovery of base without loss of the salt. Additionally, the bipolar and cation membranes stable in the basic environment so that the overall base recovery process using the combination of two and three compartment cells becomes a truly viable process.

The following examples illustrate the practice of the present invention. The examples should not be construed as limiting the invention to anything less than that which is disclosed or which would have been obvious to one of ordinary skill in the art therefrom.

In the example the current efficiency was calculated by mass balance i.e. the change in base content of the feed and/or product was determined from volume and concentration change. the base concentration was determined by titration to pH7 with standard HCl solution. The recirculation reservoirs were calibrated with a scale so that the volume could be read. The formula for calculation of current efficiency is:

current efficiency = moles of base gained in product or lost from feed ÷

(number of cells × current (A) × time (sec) ÷

96,500 (coul/mole))

Efficiency is reported for the time interval. Stack voltage (E) is the total applied potential (measured with a high impedance volt meter) including the potential needed for the electrode reactions.

EXAMPLE 1

A one gallon sample of solution from a nickel-cadmium battery manufacturing operation which contained a small amount of suspended matter (<1 gpL) was filtrated through a Whatman #41 filter paper before using the sample. The analysis of the sample is shown in Table 1 (AF feed). The substantial level of Cd found probably results from less than perfect filtration. $Cd(OH)_2$ is less soluble than $Mg(OH)_2$ and so the Cd level in this highly alkaline solution should be <1 ppm. An attempt to use a 1.2 micron filter failed because of incompatibility of the filter material with the strong caustic.

TABLE 1

| Species | AF | AP | BP1 | BP2 | AP2 | BP3 |
|---|---|---|---|---|---|---|
| NaOH (molar) | 4.92 | 0 | 3.94 | 3.92 | 1.99* | 3.70 |
| NaNO₃ (molar) | 2.60 | 3.31 | 0.02 | 0.02 | 1.8 | 0.067 |
| B (ppm) | 17 | 10 | 0.6 | 0.6 | 6 | 0.5 |
| Si (ppm) | 13 | 12 | 2.2 | 1.9 | 2 | |
| Ca (ppm) | 0.3 | 0.4 | | | 0.6 | 1.3 |
| Ni (ppm) | | 0.4 | | | 0.7 | |
| Co (ppm) | | 0.1 | | | <.1 | |
| Cr (ppm) | 0.6 | 0.4 | | | 0.6 | |
| Cd (ppm) | 6.8 | 0.8 | | | 2.0 | |
| Mo (ppm) | | 0.3 | | | 0.6 | |
| Zn (ppm) | 1.0 | 0.1 | | | 0.3 | |

*nitric acid

Figure 5:
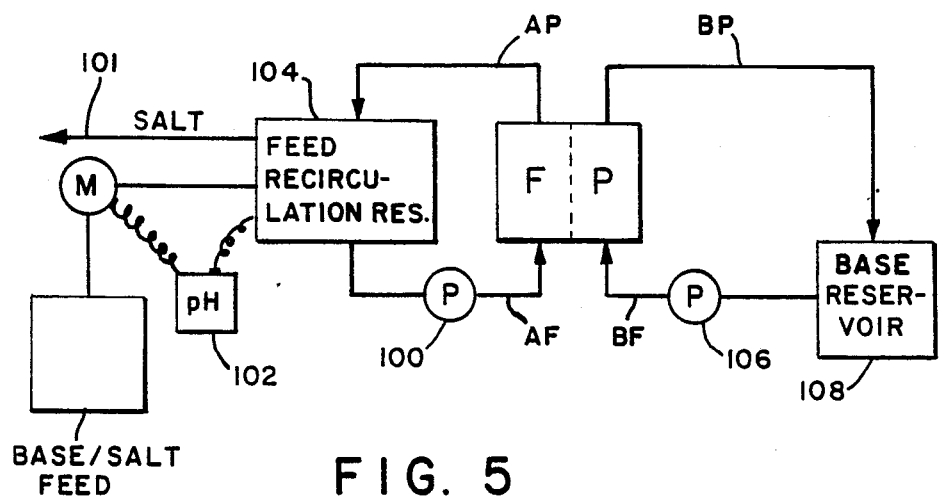
FIG. 5 is an experimental set up of a two compartment base purification unit.

The filtered sample was used as the feed to a system as shown in FIG. 5 which contained a two compartment base purification unit of the type shown in FIG. 1 containing Aquatech Systems bipolar and cation membranes. The stack consisted of 4 cells with 23 cm² for each membrane. The apparatus was set up as shown in FIG. 1. The sample was fed to the feed recirculation reservoir 104. A pH probe 102 was used to control the pump (P)100 used for feed makeup to the feed recirculation reservoir 104 so that the pH in AF was kept near 7. The less basic product from F was recycled via line AP to resevoir 104 and overflow from the feed recirculation reservoir was saved for further processing. The base loop contained base pump 106 and base resevoir 108. It was run in a batch mode from 0.4 up to about 4N. The cell was operated at 2.5 A (100 ASF) for about two days.

As shown in Table 2, no change of potential which might indicate fouling was noted. Taking into account the potential required for the electrode rinse the potential drop is estimated at about 1.8 V/cell. The efficiencies determined by mass balance on the base stream and the amount of caustic neutralized in the acid feed were above 80%. The pH of the combined salt overflow product was 7.3. Analysis of the salt overflow and two base batches (BP1, BP2) are given in Table 1. The purity of the base was excellent, containing only about 0.5 mole % of NaNO₃.

TABLE 2

| Date | Time | [Base] | E (volts) | Current Efficiency |
|---|---|---|---|---|
| Day 1 | 2:30 P | 0.48 | 11.9 | — |
| Day 2 | 9:30 A | 3.80 | — | 0.96 |
| | 12:17 P | 3.94 | — | 0.80 |
| | 12:34 P | — | 12.0 | 0.87* |
| | 2:00 P | 0.42 | — | — |
| Day 3 | 2:05 P | 3.92 | — | 0.83 0.92* |

*based on acid addition rate.

When the cell was opened for inspection the only unusual feature noted was that there was a small amount of precipitate (which could be easily washed off) on the acid feed side of the cation membranes. X-ray fluorescence showed slightly elevated levels of Si and Cd on the side of the membrane with the precipitate. The content of Cd in the acid product compared to the feed is consistent with the accumulation of this material on the cation membranes. Good filtration to lower Cd to its solubility level in the feed should eliminate this precipitate.

Figure 6:
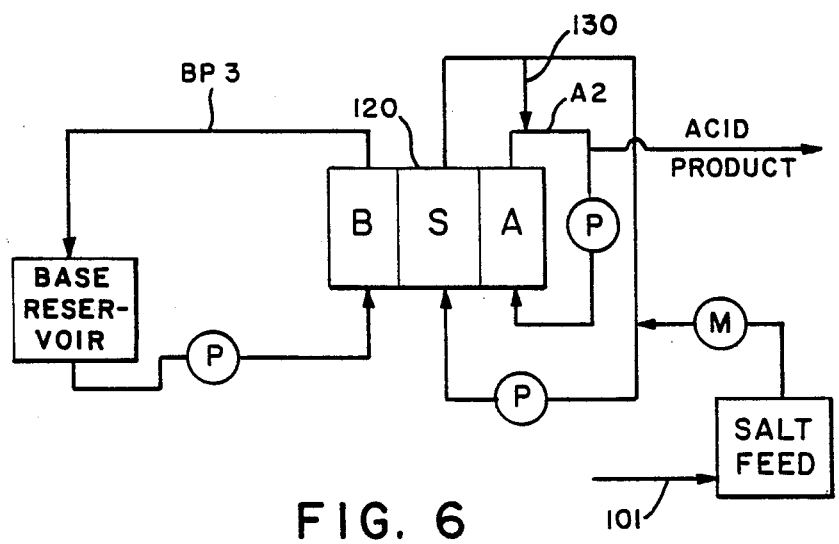
FIG. 6 is an experimental set up using a three compartment water splitter to complement the set up in FIG. 5.

The second phase of experimentation was performed using the system shown in FIG. 6 which contains a three compartment water splitter 120 of 4 cells, each with Asahi Glass AAV anion membranes and Aquatech System bipolar and cation membranes, mad as described in U.S. Pat. Nos. 4,738,764 and 4,766,161. The base was run in a batch mode. A continuous addition of salt, (the product from the feed compartments of the 2-compartment base purification unit of FIG. 5) was used and the depleted salt was used as the feed to the acid compartments.

As shown in Table 3, the experiment was begun with simulating the salt product from the base purification unit and run overnight before switching to the actual sample generated by the base purification unit. This was due to establish base line operation. The efficiency was lower than expected possibly due to a leak since the AAV has an efficiency of about 0.6 with more concentrated 3N $HNO_3$. The acid and base efficiencies were essentially the same. The acid (AP2) and base (BP3) product analysis are given in Table 1. The base from this experiment contains about 2 mole % $NaNO_3$. The acid contained a high concentration of $NaNO_3$. This is a result of using the salt overflow 130 as the acid feed and having an excess of salt feed. In a well adjusted process, $NaNO_3$ in the acid would be about 0.5M. There was a small change in the potential drop after switching from the synthetic to the sample solution, but the potential drop returned to its initial level, about 2.9 volts/cell. The potential drop is somewhat higher than in a standard 3-compartment water splitter becuase of the relatively high resistance of the AAV anion membrane.

TABLE 3

| Day | Time | [Base] | [Acid] | Eff. | E (volts) | Sol'n |
|---|---|---|---|---|---|---|
| Day 4 | 3:52 P | 0.51 | — | — | 17.6 | Synthetic |
| Days 5 | 8:35 A | 3.22 | 1.95 | 0.61 | 16.1 | " |
| | 9:04 A | 1.04 | — | — | 16.8 | Gates |
| | 9:54 A | — | — | — | 17.7 | " |
| | 10:42 A | — | — | — | 17.0 | " |
| | 12:25 P | — | — | — | 16.5 | " |
| | 4:09 P | 3.70 | 1.99 | 0.63 | 16.6 | " |

The solutions processed were very clean and no fouling or serious precipitation problems were noted.

EXAMPLE 2

The process of the present invention could be used to treat a waste nitrate solution. The material is sodium nitrate which is a biproduct of a nickel cadmium battery making operation. The salt is available as a 1.58N salt solution containing negligible divalent impurities and up to 2000 parts/million of organic material. There is also considerable amount of free sodium hydroxide in the waste salt stream. The salt stream has a total normality of 3.7, indicating that the free sodium hydroxide is 2.1N. The salt solution contains some heavy metal impurities, organic impurities, sodium hydroxide and sodium nitrate. The preferred process is that presented with reference to FIG. 4. Sodium hydroxide and sodium nitrate would be fed to the salt of a two compartment base purification unit. The streams exiting would be a base exit stream 60 which is primarily sodium hydroxide and a salt exit stream 58 which is primarily sodium nitrate. The sodium nitrate would be fed to the salt compartment of a three compartment water splitter and split in accordance with the description in the specification. A dilute salt solution exits via salt exit stream 76. This salt solution can be combined with the salt exit stream 58 from the two compartment 64 water splitter 52, and then fed into the salt compartment 66 of the three compartment water splitter 62 further splitting.

A suitable filter and suitable means known in the art can be used to remove heavy metals and organics which may be present in the stream. Useful operating conditions for the two compartment water splitter and the three compartment water splitter to convert nitrate salt solution to nitric acid at a concentration of 100 grams/liter and sodium hydroxide at a concentration of a 150 grams/liter are summarized in Table 4 below.

TABLE 4

| | Two Compartment Cell | Three Compartment Cell |
|---|---|---|
| Current density ma/cm$^2$ | 100 | 100 |
| Cell Voltage, V | 1.8 | 2.6-2.7 |
| Current efficiency, % | 80 + | 70 + |
| $HNO_3$ conc., gm/l | — | 100 |
| NaCl con., gm/l | 150 | 50-150 |

EXAMPLE 3

This example illustrates the parameters proposed for treating a solution that contains 13% sodium nitrate and 8% sodium hydroxide. A filter can be placed in salt exit stream 58 to remove heavy metal hydroxide such as cadmium hydroxide $Cd(OH)_2$ and nickel hydroxide. The proposed parameters for a two compartment stack are that the voltage per cell be 1.8 volts the current density 100 amps/ft sq. and the current efficiency 85%.

The proposed conditions in the three compartment cell are a voltage/cell of 2.4 volts, a current density of 100 amps/ft. sq., and the current efficiency of 75%.

The disadvantages of the prior art methods are overcome by using the method of the current invention. The solution of $NaOH/NaNO_3$ is introduced into the feed compartments of a 2 compartment base purification unit and enough current is passed to make the solution essentially neutral. The remaining substantially neutral salt solution is then processed in a conventional 3 compartment water splitter. The advantage of this process is that no dilution has been made and most of the processing is carried out in a 2 compartment water splitter. There is a savings in both power and capital cost for such systems because there is one less membrane and solution compartment per unit cell.

What is claimed:

1. A method of separating base from an aqueous feed stream comprising at least one base selected from the group consisting of NaOH, KOH and $NH_4OH$ and at least one salt selected from the group consisting of NaCl, $NaNO_3$, $NH_4Cl$, $Na_2SO_4$, $FeSO_4$, $Fe_2(SO_4)_3$, $Ni(NO_3)_2$, $Cr(BF_4)_3$, $NH_4NO_3$, $Na_3PO_4$, $CuSO_4$, KF, said salts comprising cations and anions, in an apparatus comprising at least one bipolar membrane comprising a cation layer and an anion layer, wherein each cation membrane is between at least one first bipolar membrane and at least one second bipolar membrane, there being a feed compartment between the cation membrane and the cation layer of the at least one first bipolar membrane, and a product compartment between the cation membrane and the anion layer of the at least one second bipolar membrane, comprising the steps of:

feeding an aqueous feed stream comprising base and salt to the at least one feed compartment;

feeding an aqueous product stream to the at least one product compartment;

applying a sufficient electrical potential across the apparatus to cause a direct current resulting in the introduction of $OH^-$ from the bipolar membrane into the product compartments and transport of cations from the feed across the anion membrane into the product compartment; and removing the resulting product stream from the product compartment; and removing the resulting feed stream from the feed compartment.

2. The method as recited in claim 1 wherein the apparatus comprises a plurality of alternating bipolar membranes and cation membranes.

3. The method as recited in claim 1 wherein the apparatus comprises at least one feed compartment, each feed compartment alternating with one product compartment.

4. The method as recited in claim 1 wherein the salt is $NaNO_3$.

5. The method as recited in claim 1 wherein the base is NaOH

6. The method as recited in claim 1 wherein the base concentration is from 0.1N to 5N.

7. The method as recited in claim 1 wherein the salt concentration is from 0.001 molar to saturation.

8. The method as recited in claim 1 wherein the electric current is from 25 to 300 amps per square foot.

9. The method as recited in claim 1 wherein the current is stopped or substantially reduced for from 0.5 to 5 minutes at intervals of from 15 minutes to 2 hours.

10. The method as recited in claim 1 wherein the linear flow velocity in the at least one feed compartment is at least 2.5 cm/sec.

11. The method as recited in claim 1 further comprising the step of reacting the base from the resulting product stream to form another product.

12. The method as recited in claim 11 wherein the base is NaOH and is reacted with $Al(OH_3)$ to form sodium aluminate.

13. The method as recited in claim 11 wherein the base is NaOH and is reacted with $SiO_2$ to form $Na_2SiO_3$.

14. A method comprising the steps of:

feeding a solution comprising salt and a base to a base purification unit;

splitting the solution of salt and base to form a first salt stream and a first base stream;

feeding the first salt stream to a three compartment water splitter; and splitting the first salt stream to form a second base stream, and a second acid stream comprising an acid and optionally salt, and a dilute salt stream.

15. The method of claim 14 wherein the first salt stream has a pH of from 7 to 9.

16. The method of claim 14 further comprising the step of purifying the first salt stream to remove heavy metal impurities.

17. The method of claim 14 further comprising the step of concentrating the dilute salt stream.

18. The method of claim 14 wherein the dilute salt stream is concentrated by electrodialysis.

19. The method as recited in claim 14 wherein the dilute salt stream is concentrated by reverse osmosis.

20. The method as recited in claim 14 wherein the three compartment water splitter comprises an acid compartment, a base compartment and a salt compartment and the dilute salt stream is fed to the acid compartment.

21. The method as recited in claim 14 wherein the salt is selected from $NaNO_3$, $K_2SO_4$, and $(NH_4)_2 SO_4$.

22. The method as recited in claim 14 wherein the base is selected from NaOH, KOH and $NH_4OH$.

23. The method as recited in claim 1 wherein the base is NaOH and the salt is $NaNO_3$.

* * * * *

UNITED STATES PATENT AND TRADEMARK OFFICE
CERTIFICATE OF CORRECTION

PATENT NO. : 4,976,838
DATED : December 11, 1990
INVENTOR(S) : K.N. Mani, F.P. Chlanda, Y. C. Chiao It is certified that error appears in the above-identified patent and that said Letters Patent is hereby corrected as shown below:

Col. 4, line 56, "hyroxide" should read --hydroxide--

Col. 8, line 65 , "than" should read --then--

Col. 11, line 1, "mad" should read --made--

Col. 13, line 2 "anion" should read --cation--

Col. 14, delete line 17

Signed and Sealed this

Ninth Day of June, 1992

Attest:

DOUGLAS B. COMER

Attesting Officer

Acting Commissioner of Patents and Trademarks